United States Patent [19]

Bennett et al.

[11] Patent Number: 5,707,554

[45] Date of Patent: Jan. 13, 1998

[54] ELECTRICALLY CONDUCTIVE SURFACE RELEASE POLYMERS

[75] Inventors: Everett Wyman Bennett, Easthampton, Mass.; Weitong Shi, Glastonbury, Conn.

[73] Assignee: Rexam Graphics, Incorporated, South Hadley, Mass.

[21] Appl. No.: 646,602

[22] Filed: May 8, 1996

[51] Int. Cl.$^6$ .............................. H01B 1/00; C08F 30/08; C08F 130/08; C08F 230/08

[52] U.S. Cl. .............................. 252/500; 526/279

[58] Field of Search ............... 252/500, 518; 526/279

[56] References Cited

U.S. PATENT DOCUMENTS

| | | | |
|---|---|---|---|
| 4,322,331 | 3/1982 | Shay | 524/815 |
| 4,420,541 | 12/1983 | Shay | 428/523 |
| 4,877,687 | 10/1989 | Azegami et al. | 428/520 |
| 4,981,729 | 1/1991 | Zaleski | 427/393.5 |
| 5,035,849 | 7/1991 | Uemura et al. | 264/255 |
| 5,130,391 | 7/1992 | Ahmed et al. | 526/288 |
| 5,400,126 | 3/1995 | Cahill et al. | 355/278 |
| 5,413,731 | 5/1995 | Adler et al. | 252/174.24 |
| 5,415,502 | 5/1995 | Cahill et al. | 355/278 |
| 5,483,321 | 1/1996 | Cahill et al. | 355/200 |
| 5,486,421 | 1/1996 | Kobayashi | 428/421 |
| 5,621,057 | 4/1997 | Herzig et al. | 526/248 |

FOREIGN PATENT DOCUMENTS

| | | |
|---|---|---|
| 04001214 | 1/1992 | Japan. |
| 06184470 | 7/1994 | Japan. |
| 06344514 | 12/1994 | Japan. |
| 07040498 | 1/1995 | Japan. |

OTHER PUBLICATIONS

Ehecryl® 350 Technical Data Meet, Radcure, Louisville, Ky., May 1990.
Ehecryl® 1360, Technical Data Sheet, Radcure, Louisville Ky., May 1990.
Rad 2500, Eureletter, Captian Arioceater, Inc., vol. 13(3), Mar. 1996, p. 7.

Primary Examiner—Paul Lieberman
Assistant Examiner—Mark Kopec
Attorney, Agent, or Firm—Ratner & Prestia

[57] ABSTRACT

A polymeric material which is both electrically conductive, possesses surface release properties and can be formed into high-gloss, visually transparent coatings; is polymerized from a liquid mixture of three free radical, addition polymerizable materials by radiation induced polymerization. The liquid mixture contains: 1 to 80 weight parts of an ethylenically unsaturated, quaternary ammonium precursor; 0.1 to 10 weight parts of an ethylenically unsaturated, organo-silicone precursor; and, 5 to 95 weight parts of a multifunctional precursor containing at least two ethylenically unsaturated groups, which is a multifunctional monomeric material, an oligomeric material or a combination thereof. Optionally, the liquid mixture may contain up to 60 weight parts of an ethylenically unsaturated acidic precursor and up to 50 weight parts of one other monofunctional precursor containing one ethylenically unsaturated group. By adjusting concentrations of the three polymerizable components, surface conductivity can be varied over a wide range from an electrical resistance of $10^5$ ohm/□ to $10^{12}$ ohm/□, without adversely affecting surface release characteristics. Such tailored co-polymers may be used as coatings, fibers or other solid shapes and are useful as electrically conductive release coatings in electrographic and electrostatic imaging materials; and as antistatic coatings for sheet or fiber products which further require protective surface release for easy removal of laminate components, markings, stains, dirt and the like.

25 Claims, No Drawings

ELECTRICALLY CONDUCTIVE SURFACE RELEASE POLYMERS

BACKGROUND THE INVENTION

1. Field of the Invention

This invention relates to electrically conductive polymeric materials. Further, this invention relates to such conductive polymeric materials that additionally have adhesive or release properties and which can be coated as transparent glossy or matte surface films.

2. Description of Related Art

A large body of technical literature exists pertaining to electrically conductive coatings and release coatings, but materials providing both properties, especially those capable of high gloss and transparency, are virtually if not completely unknown.

Materials whose electrical conductivity relies upon conductive or semiconductive surface coatings such as vacuum deposited aluminum or copper or sputtered doped indium or tin oxide when over-coated with an intrinsically insulative release layer of methylsilicone or fluoropolymer exhibit high surface electrical resistivity. Likewise, when the same types of metals or semiconductors are employed as finely divided powders dispersed in a film forming polymer matrix, as illustrated by Nakanishi et al., Japanese Patent Publication 60/229,965; Kojima et al., U.S. Pat. No. 3,767,519; and Burdette et al., U.S. Pat. No. 3,903,328, the particle-to-particle contact required for good electrical conductivity requires such a high filler-to-matrix volume ratio that the high surface energy particles prevent the formation of a low surface energy release surface.

Attempts to design systems using ionic electrical conductivity provided by either monomeric or polymeric ammonium or phosphonium quaternary salts in combination with adhesive fluorocarbon or polysiloxane film forming polymers likewise fail because the solubility parameters of the components are so different that mixtures of such components are totally incompatible and will not form a continuous defect-free coating.

Another potential approach to such a dual function layer, could be analogous to the widely used practice of adding comparatively minor amounts of fatty acid anti-blocking agents or low molecular weight quaternary ammonium salt antistatic agents to a polymer coating and relying on incompatibility driven migration to the coating surface to achieve the desired properties. Unfortunately, such an approach does not provide a stable product because diffusion from the bulk to the surface is both time and concentration dependent and such additives being unbonded guests in a host film's surface can be transferred by contact resulting in variable properties.

Although, a satisfactory means for providing a single polymeric coating with such a combination of electrical and release properties remains elusive, such an electrically conductive release coating (especially a glossy transparent one) could be used in many different products, such as, high quality electrographic image transfer products, electrostatic imaging products, antistatic protection for film and fiber products, and the like.

SUMMARY OF THE INVENTION

This combination of desired properties has been achieved by the electrically conductive polymeric release material of this invention which comprises in polymerized form:

A) 1 to 80 weight parts of a polymerizable, ethylenically unsaturated ammonium precursor;

B) 0.1 to 10 weight parts of a polymerizable, ethylenically unsaturated, organo-silicone precursor;

C) 5 to 95 weight parts of a multifunctional polymerizable precursor containing at least two polymerizable, ethylenically unsaturated functional groups, wherein the multifunctional polymerizable precursor is a multifunctional monomeric material, an oligomeric material or a combination thereof;

D) 0 to 60 weight parts of a polymerizable, ethylenically unsaturated acidic precursor containing at least one carboxylic acid group; and E) 0 to 50 weight parts of an other monofunctional precursor containing one polymerizable, ethylenically unsaturated functional group; wherein the polymeric release material has a surface having an electrical resistance between about $1\times10^5$ ohm/□ and $1\times10^{12}$ ohm/□.

DETAILED DESCRIPTION OF THE INVENTION

The present invention relates to a novel polymeric material which is both electrically conductive and possesses surface release properties and which can be formed into high-gloss, visually transparent coatings. In particular, it has been discovered that useful coatings which provide both useful electrical conductivity and useful release characteristics can be made by the choice of at least three free-radical polymerizable materials that can be combined into a unique coating through radiation induced, free radical copolymerization. In this way, such polymerizable materials that would otherwise form individual polymers that are immiscible and incapable of affording defect-free coatings, can be conveniently converted via copolymerization into a single phase, thus achieving "forced" compatibility and simultaneously avoiding any problems due to component migration. By suitable choice of concentrations of the polymerizable components, surface conductivity can be varied over a wide range, i.e., an electrical resistance between about $1\times10^5$ ohm/□ and $1\times10^{12}$ ohm/□, without adversely affecting surface release characteristics. Such tailored co-polymers may be formed into coatings, fibers or other solid shapes and find utility in a number of applications such as electrically conductive release coatings for use in electrographic and electrostatic imaging materials (i.e., having an electrical resistance between about $1\times10^5$ ohm/□ and $1\times10^8$ ohm/□); antistatic coatings for sheet or fiber products which further require protective surface release for easy removal of laminate components, markings, stains, dirt and the like (i.e., having an electrical resistance between about $1\times10^9$ ohm/□ and $1\times10^{12}$ ohm/□).

The electrically conductive polymeric release material is polymerized from a liquid mixture comprising at least three-free radical polymerizable materials containing one or more ethylenically unsaturated functional group(s). Based on the weight of the polymer to be formed, the liquid mixture comprises: 1 to 80 weight parts, preferably 60 to 80 weight parts, of a polymerizable, ethylenically unsaturated, quaternary ammonium precursor; 0.1 to 10 weight parts, preferably 0.2 to 2 weight parts, of a polymerizable, ethylenically unsaturated, organo-silicone precursor; and, 5 to 95 weight parts of a multifunctional polymerizable precursor containing at least two polymerizable, ethylenically unsaturated functional groups, wherein the multifunctional polymerizable precursor is a multifunctional monomeric material, an oligomeric material or a combination thereof. [Weight parts are equivalent to weight percent.] Preferably, the polymerizable, ethylenically unsaturated, organosilicone precursor is a polyoxyalkylene modified organosilicone having medium to high hydrophile/lipophile balance (HLB) and dispersing ability. A medium HBL is intended to mean 8–5 and a high HBL is 13∞18 as defined in Encyclopedia of Chemical Technology, Kirk-Othmer, 3rd ed., vol.8, pg. 911. Optionally, the liquid mixture may also contain up to 60 weight parts of a polymerizable, ethylenically unsaturated acidic precursor containing at least one carboxylic acid group to improve conductivity of the resulting polymer; and up to 50 weight parts of an other monofunctional precursor containing one polymerizable, ethylenically unsaturated functional group to further adjust the properties of the polymer, e.g., the glass transition temperature and flexibility. Preferably, the acidic precursor has an acid number between about 100 and about 900. When the polymerizable compounds are to be polymerized by ultraviolet light, the mixture typically will contain up to 10 weight parts of a photoinitiator system.

The polymeric materials corresponding to the various mixtures of precursors may be characterized by several procedures using films of the polymeric materials coated on sheet substrates as hereinafter described in detail. Although the polymers may be usefully employed in a number of embodiments, the polymers will be described as a polymeric film coated on a sheet substrate material primarily for use in electrographic or electrostatic imaging applications, but is not intended to be limited thereby. It has been discovered that coated films of the polymeric material typically adhere tightly to the substrate, are transparent, have a high gloss surface, and have a surface resistivity of as low as about $1 \times 10^5$ ohm per square while affording easy release properties from aggressive contact adhesives.

Polymer Characterization

The following procedures are used to characterize the polymeric materials of this invention as illustrated in the examples contained herein.

Polymer electrical conductivity is expressed herein as the surface resistivity of a film of the polymeric material coated on a sheet substrate, and is expressed in "ohms per square", hereinafter identified as "$\Omega/\square$". Unless otherwise specified, all surface resistivity measurements were made herein under TAPPI conditions, i.e., at 50% relative humidity and 73° F. (about 23° C.), as measured with a probe having a 6.0 inch×6.0 inch area (15.24 cm×15.25 cm) between two 0.50-inch (1.27 cm) square cross-section brass bars connected to a General Radio 1864 Megohmmeter. Each polymeric coating is cut to fit the outside dimensions of the probe and conditioned at 50% relative humidity at 73° F. (23° C.) for about 1 to 2 hours before measurement is made.

Surface release characteristic of a polymeric material is determined using Scotch® brand 610 pressure sensitive contact-adhesive tape (a widely accepted standard for film adhesion testing) and a film of the polymeric material coated on a sheet substrate. (Scotch® brand 610 tape is a product of the 3M Corporation, St. Paul, Minn.) Unless otherwise specified, all surface release measurements disclosed herein, were made as follows: An 8 inch long (20.3 cm), 1 inch (2.54 cm) wide strip of Scotch® 610 general purpose, transparent tape (610 tape), is adhered to the surface of the coated polymeric sheet and the excess sheet is trimmed from around the adhered 610 tape strip. The 610 tape strip is then peeled from the coated polymeric sheet at an angle of 180° and a rate of about 250 mm/min using an Instron tester and the peel force required noted. Alternatively, when quantitative measurements are not required, the 610 tape strip may be stripped manually at an angle of 180° and the relative ease of removal noted. In both instances, the surfaces of the polymeric coating and of the adhesive of the stripped tape is inspected for any transfer of adhesive material to the coating surface, or transfer of polymeric material to the 610 tape. Those skilled in the art will recognize that the peel force will be related to both the concentration of release agent in the polymer's surface and the aggressiveness of the adhesive employed.

Surface topography of a coated polymeric material depends upon several factors, e.g., coating fluid viscosity, coating thickness, substrate roughness, substrate penetration, and the specific coating method used. Surface topography influences the reflectivity of a film of the polymeric material, i.e., its gloss level. Unless otherwise specified, all surface gloss measurements were determined using a Gardner Laboratory Glossgard II 75° Glossmeter, which measures the amount of specular reflectance of a beam of light from a surface wherein the beam of light is incident on the surface at an angle of 75° from the surface plane. Sheffield surface roughness was measured using a Giddiness & Luis Smoothcheck Apparatus.

Unless otherwise specified, all viscosity measurements of monomers, oligomers and mixtures thereof used to prepare the polymeric material of this invention, were determined using a Brookfield LVT Viscometer with Spindle No. 3 at 30 rpm, and at about 72° F.

Polymer Precursors

As used herein the term "precursor" is intended to mean a polymerizable, ethylenically unsaturated, monomeric material, oligomeric material or other like component. Thus the precursors used to polymerize the electrically conductive polymeric release material of this invention are the free radical, addition polymerizable monomeric materials, oligomeric materials or other like components, in which each precursor contains one or more ethylenically unsaturated functional group(s). Each component is further described in the following paragraphs. (Trademarks are identified in the "Glossary of Trademarks and Tradenames," which follows the examples.)

A) Ethylenically unsaturated ammonium precursor

As used herein the term "ammonium precursor" is intended to mean an ethylenically unsaturated, quaternary ammonium salt compound which contains an ammonium cation and an inorganic or organic salt anion. Electrical conductivity of the polymer is obtained by use of the reactive ammonium precursors such as (3-(methacryloylamino)propyl)trimethylammonium chloride (MAPTAC), dimethylaminoethylmethacrylate dimethylsulfate quaternary (Ageflex® FMIQ80DMS), dimethylaminoethylacrylate methylchloride quaternary (Ageflex® FA1Q80MC), dimethylaminoethylmethacrylate methylchloride quaternary (Ageflex® FMIQ75MC), dimethylaminoethylacrylate dimethylsulfate quaternary (Ageflex® FA1Q80DMS), diethylaminoethylacrylate dimethylsulfate quaternary (Ageflex® FA2Q80DMS), dimethyldiallylammonium chloride (Ageflex® DMDAC), and vinylbenzyltrimethylammonium chloride, all of which are water soluble and, typically supplied with up to 50 wt. percent water content. Consequently, such quaternary components are only miscible with a few (see the comparative example) very hydrophilic precursors, unless a coupling solvent is used such as those described below. Such "quaternary salt precursors" typically have the following structures:

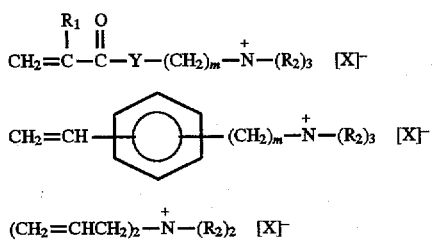

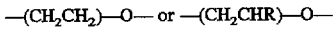

wherein $R_1$ is H, methyl, or ethyl; Y is —O— or —(NR$_3$)— wherein $R_3$ is H or a $C_1$–$C_4$ alkyl; m is an integer from 1 to 4, each $R_2$ individually is a $C_1$–$C_4$ alkyl group; and [X]$^-$ is an anion. In particular the quaternary salt precursors contains a cation taken from the group consisting of (3-(methacryloylamino)propyl)trimethylammonium, (2-(methacryloyloxy)-ethyl)trimethylammonium, (2-(acryloyloxy)-ethyl)trimethylammonium, (2-(methacryloyloxy)-ethyl)-methyldiethylammonium, 4-vinylbenzyltrimethylammonium, dimethyldiallylammonium and mixtures thereof. The anion of quaternary salt precursors may be any inorganic or organic salt anion conventionally used in such quaternary salts such as chloride, methosulfate, nitrate, and the like. It was noted that the conductivity (or resistivity) of the coating is determined largely (but not wholly) by the molal concentration (number of moles per kilogram, all densities being close to unity) of quaternary salt present. For this reason, the most desirable quaternary structure is that with the lowest molecular weight, 2-acryloyloxyethyl trimethylammonium chloride, which also is expected to polymerize more easily than a methacrylate.

B) Ethylenically unsaturated, organo-silicone precursor

The ethylenically unsaturated, organo-silicone precursor provides surface release characteristics to the polymeric material. Surprisingly, only a small quantity of this organo-silicon compound, e.g., about 0.1 to 10.0 weight %, is required to provide adequate surface release characteristics to the polymeric material. In contrast to the ethylenically unsaturated ammonium precursors described supra, ethylenically unsaturated, organo-silicone compounds typically are immiscible with water. The term "immiscible" as used herein is intended to have its conventional meaning, i.e., a two-phase liquid mixture in which each liquid is insoluble or partially soluble in the other liquid and wherein each separate liquid phase is separated from the other by a common liquid-liquid interface, such as a suspension, dispersion, colloid, and the like. Typically, the polymerizable, ethylenically unsaturated, organo-silicone is an acrylated silicone such as an acrylated-oxyalkylene-silicone wherein the alkylene is ethylene, propylene or a combination thereof, e.g., Ebecryl® 350 and Ebecryl® 1360 which have been discovered to have surfactant properties. From their cloud point behavior, water solubility, and infrared spectra, Ebecryl® 350 and Ebecryl® 1360 are believed to be acrylated polyoxyalkylene silicon copolymers wherein the solubilizing polyether units are derived from polyethylene glycol, polypropylene glycol, or a mixture of the two polyethers. The simpler acrylated polydimethylsiloxanes such as Goldschmidt RC-726, are commonly employed in the release coating industry but are not water soluble. However, such acrylated polydimethylsiloxanes can be employed in this invention, particularly, if used in conjunction with an acrylated surfactant type silicone polymer such as Ebecryl® 350 or Ebecryl® 1360 described supra. As used herein, "acrylated-oxyalkylene-silicone" is intended to mean an organo-silicone precursor having one or more acrylate or methacrylate groups bonded thereto, and one or more oxyalkylene groups incorporated therein or pendant thereto, wherein an oxyalkylene group has the structure:

—(CH$_2$CH$_2$)—O— or —(CH$_2$CHR)—O— wherein R is methyl. Such acrylated-oxyalkylene-silicones may be used alone or in combination with an acrylated-silicone. Acrylated-oxyalkylene-silicones of this type include a polyacrylated polydimethylsiloxane-polyether copolymer having a viscosity of 200–300 centipoise at 25° C. (Ebecryl® 350); a hexa-acrylate of a polydimethylsiloxane-polyether copolymer having a viscosity of 1000–3000 centipoise at 25° C. (Ebecryl® 1360); and acrylate derivatives of hydroxy endcapped polydimethylsiloxane-polyether copolymers such as Silwet® L-7604, Coat-o-Sil® 3500 and Coat-o-Sil® 3501. Although the acrylated-silicone class of compounds (e.g., acrylated polydimethylsiloxane) are not water miscible nor compatible with quaternary salts, it was discovered that acrylated-oxyalkylene-silicones were in actual fact acrylated surfactants of the siloxane-g-polyether type and, furthermore, were of high enough hydrophile-lipophile balance to have significant water solubility. Accordingly, when such acrylated silicone surfactants are incorporated into the quaternary containing coating mixtures, a solution can be obtained in some recipes (precursor rich recipes, especially those with a coupling solvent—see example 2) and in others a usefully stable dispersion (recipes containing oligomeric acrylates to improve cure rate and physical properties—see example 5), both of which types can be readily cured to a dry film. The efficacy of quite small amounts of such an acrylated silicone surfactant, one to four weight percent, in providing release properties toward aggressive pressure-sensitive adhesives such as 610 tape is outstanding. Without being bound by any one theory, such properties are believed to be due to both the surfactant's tendency to seek the air interface and a salting out driving force due to a change in solubility as the polymerizing quaternary salt medium builds molecular weight. It has been noted that the efficacy of the acrylated silicone release properties seems to be affected by the quaternary salt concentration being better with 28–30 wt.% quaternary than with 20–25 wt.% present; and that the acrylated silicone, Ebecryl® 350, provides good 610 tape release at one to four weight % all by itself and use of Ebecryl® 1360 provides no significant advantage aside from increasing the stability of dispersion type mixes. It was also noted that Ebecryl® 1360 acrylated siloxane (found to be a high HLB siloxane-g-polyether surfactant) caused significant and undesirable viscosity exaltation in some mixes compared to analogous formulations using Ebecryl® 350 (2400 cps vs. 1400 cps).

C) Multifunctional polymerizable precursor

The multifunctional polymerizable precursor functions as a free radical crosslinking agent to accelerate growth of the polymer during polymerization. The multifunctional polymerizable precursor may be a multifunctional monomeric material, an oligomeric material, or a combination thereof. The term "multifunctional" as used herein is intended to mean two or more ethylenically unsaturated functional groups capable of free radical addition polymerization. "Monomeric materials" hereinafter are identified as "monomers". The term "oligomer" or "oligomeric", as used herein has its conventional meaning, a polymer whose properties change with the addition of one or a few repeating units. As such an oligomer functions as a pre-polymer having ethylenic groups capable of further polymerization. "Oligomeric materials" hereinafter are identified as "oligomers".

Typical multifunctional monomers which are useful in forming the polymeric material of this invention include, but are not intended to be limited thereby, trimethylolpropanetriacrylate, pentaerythritoltriacrylate, pentaerythritoltetraacrylate, pentaerythritoltetramethacrylate, ethoxylated-trimethylolpropanetriacrylate, glycerolpropoxytriacrylate, ethyleneglycoldiacrylate, tripropyleneglycoldiacrylate, and tetraethyleneglycoldiacrylate. Particularly useful for this invention are the ethoxylated precursors such as ethoxylated-trimethylolpropanetriacrylate (TMPEOTA).

Oligomers typically are used in the coating dispersions to achieve a cure rate rapid enough to meet polymer productivity goals. Typical oligomers which are useful in forming the polymeric material of this invention include, but are not intended to be limited thereby, acrylated urethanes, polyesters, and polyepoxides; and acrylics. The criteria used to select useful oligomers are: viscosity, compatibility, glass transition temperature (Tg), degree of functionality, and coating glossiness. Illustrative of such oligomers are the commercial products tabulated along with their properties in the following tables.

Acrylated urethanes that are useful include

Ebecryl® 230, an aliphatic urethane; Ebecryl® 244, an aliphatic urethane & 10% 1,6-hexanediol diacrylate; Ebecryl® 265, an aliphatic urethane & 25% tripropyleneglycol diacrylate; Ebecryl® 270, an aliphatic urethane; Ebecryl® 285, an aliphatic urethane & 25% tripropyleneglycol diacrylate; Ebecryl® 4830, an aliphatic urethane & 10% tetraethyleneglycol diacrylate; Ebecryl® 4833, an aliphatic urethane & 10% N-vinyl-2-pyrrolidone; Ebecryl® 4834, an aliphatic urethane & 10% N-vinyl-2-pyrrolidone; Ebecryl® 4881, an aliphatic urethane & 10% tetraethyleneglycol diacrylate; Ebecryl® 4883, an aliphatic urethane & 15% tripropyleneglycol diacrylate; Ebecryl® 8803-20R, an aliphatic urethane & 20% tripropyleneglycol diacrylate & 8% ethoxyethoxyethyl acrylate; and Ebecryl® 8803, an aliphatic urethane. Properties of these products are given in Table 1.

TABLE 1

| Product | Viscosity[1] | Mol. Wt.[2] | Groups[3] | Tg[4] |
|---|---|---|---|---|
| Ebecryl® 230 | 30–50 @ 25° | — | 2 | 39 |
| Ebecryl® 244 | 7.0–9.0 @ 60° | 2000 | 2 | — |
| Ebecryl® 265 | 25–45 @ 25° | 2000 | 3 | 38 |
| Ebecryl® 270 | 2.5–3.5 @ 60° | 1500 | 2 | — |
| Ebecryl® 285 | 20–30 @ 25° | 1200 | 2 | 42 |
| Ebecryl® 4830 | 2.5–4.5 @ 60° | 1200 | 2 | 42 |
| Ebecryl® 4833 | 2.0–3.0 @ 60° | 1200 | 2 | 47 |
| Ebecryl® 4834 | 3.0–4.0 @ 60° | 1600 | 2 | 32 |
| Ebecryl® 4881 | 5.3–8.1 @ 60° | 2000 | 2 | 44 |
| Ebecryl® 4883 | 2.8–4.2 @ 60° | 1600 | 2 | 47 |
| Ebecryl® 8800-20R | 1.8–3.0 @ 65° | 1600 | 2.5 | 59 |
| Ebecryl® 8803 | 25–35 @ 65° | 2300 | 2.4 | 52 |

[1]Viscosity is given in "10 poise" units & temperature is in "°C.".
[2]Molecular weight is based on neat undiluted oligomer.
[3]"Groups" is the number of ethylenic functional groups.
[4]"Tg" is glass transition temperature given in °C.

Polyester oligomers that are useful include

Ebecryl® 450, a fatty acid modified polyester; Ebecryl® 505, an unsaturated polyester & 40% tripropyleneglycol diacrylate; Ebecryl® 509, an acid modified unsaturated polyester & 30% 2-hydroxyethyl-methacrylate; Ebecryl® 524, an acid modified polyester & 30% 1,6-hexanediol diacrylate; Ebecryl® 525, an acid modified polyester & 40% tripropyleneglycol diacrylate; Ebecryl® 584, a chlorinated polyester & 40% 1,6-hexanediol diacrylate; Ebecryl® 585, a chlorinated polyester & 40% tripropyleneglycol diacrylate; Ebecryl® 810, a tetrafunctional polyester acrylate; Ebecryl® 1810, a tetrafunctional polyester acrylate; and Photomer® 5018, an aliphatic tetrafunctional polyester acrylate. Properties of these products are given in Table 2.

TABLE 2

| Product | Viscosity[1] | Mol. Wt.[2] | Groups[3] | Tg[4] |
|---|---|---|---|---|
| Ebecryl® 450 | 6–8 @ 25° | — | 6 | |
| Ebecryl® 505 | 1.75–2.25 @ 60° | — | | 45 |
| Ebecryl® 509 | 6–8 @ 25° | — | | |
| Ebecryl® 524 | 55–65 @ 25° | 1000 | | |
| Ebecryl® 525 | 35–45 @ 25° | 1000 | | |
| Ebecryl® 584 | 1.5–2.5 @ 25° | — | | 44 |
| Ebecryl® 585 | 4.2–5.2 @ 25° | — | | 29 |
| Ebecryl® 810 | 0.45–0.65 @ 25° | 900 | 4 | 31 |
| Ebecryl® 1810 | 0.45–0.65 @ 25° | 900 | 4 | 32 |
| Photomer® 5018 | 0.7–1.4 @ 25° | 1000 | 4 | 0 |

[1]Viscosity is given in "10 poise" units & temperature is in "°C.".
[2]Molecular weight is based on neat undiluted oligomer.
[3]"Groups" is the number of ethylenic functional groups.
[4]"Tg" is glass transition temperature given in °C.

Polyepoxy oligomers that are useful include

Ebecryl® 605, a bisphenol A epoxy diacrylate & 25% tripropyleneglycol diacrylate; Ebecryl® 616, an epoxy dimethacrylate oligomer & 25% trimethylolpropane triacrylate; Ebecryl® 860, an epoxidized oil acrylate; Ebecryl® 1608, a bisphenol A epoxy acrylate & 20% propoxylated glycerol triacrylate; Ebecryl® 3200, a blend of aliphatic and aromatic acrylated epoxy resins; Ebecryl® 3201, an acrylated epoxy resin; Ebecryl® 3605, a partially acrylated bisphenol A epoxy resin; Ebecryl® 3700-20T, a bisphenol A epoxy acrylate & 20% trimethylolpropane triacrylate; Ebecryl® 3701-20T, a modified bisphenol A epoxy acrylate oligomer & 20% trimethylolpropane triacrylate; and Ebecryl® 3700, a bisphenol A epoxy diacrylate. Properties of these products are given in Table 3.

TABLE 3

| Product | Viscosity[1] | Mol. Wt.[2] | Groups[3] | Tg[4] |
|---|---|---|---|---|
| Ebecryl® 605 | 6.5–8.5 × 10³ @ 25° | 525 | 2 | 65 |
| Ebecryl® 616 | 20–30 @ 25° | 555 | 2 | 82 |
| Ebecryl® 860 | 19–31 @ 25° | 1200 | 3 | 13 |
| Ebecryl® 1608 | 0.9–1.1 @ 60° | 525 | 2 | 67 |
| Ebecryl® 3200 | 1.5–3.0 @ 25° | 435 | 1.6 | 48 |
| Ebecryl® 3201 | 2.5–5.0 @ 25° | 426 | 1.9 | 8 |
| Ebecryl® 3605 | 0.5–0.8 @ 65° | 450 | 1 | 43 |
| Ebecryl® 3700-20T | .43–.63 @ 65° | 524 | 2 | 75 |
| Ebecryl® 3701-20T | .85–1.25 @ 65° | 840 | 2 | 62 |
| Ebecryl® 3700 | 1.8–2.8 @ 65° | 524 | 2 | 65 |

[1]Viscosity is given in "10 poise" units & temperature is in "°C.".
[2]Molecular weight is based on neat undiluted oligomer.
[3]"Groups" is the number of ethylenic functional groups.
[4]"Tg" is glass transition temperature given in °C.

Acrylic oligomers that are useful include

Ebecryl® 745, an acrylic oligomer & 23% 1,6-hexanediol diacrylate & 23% tripropylene-glycol diacrylate; Ebecryl® 754, an acrylic oligomer & 30% 1,6-hexanediol diacrylate; and Ebecryl® 1755, an acrylic oligomer & 35% tripropyleneglycol diacrylate. Properties of these materials are given in Table 4.

TABLE 4

| Product | Viscosity[1] | Mol. Wt.[2] | Groups[3] | Tg[4] |
|---|---|---|---|---|
| Ebecryl® 745 | 25–35 @ 25° | | | 30 |
| Ebecryl® 754 | 70–80 @ 25° | | | 22 |

TABLE 4-continued

| Product | Viscosity[1] | Mol. Wt.[2] | Groups[3] | Tg[4] |
| --- | --- | --- | --- | --- |
| Ebecryl® 1755 | 70–80 @ 25° | | | 15 |
| Ebecryl® 860 | 19–31 @ 25° | 1200 | 3 | 13 |

[1]Viscosity is given in "10 poise" units & temperature is in "°C.".
[2]Molecular weight is based on neat undiluted oligomer.
[3]"Groups" is the number of ethylenic functional groups.
[4]"Tg" is glass transition temperature given in °C.

Review of general properties and characteristics of a wide range of oligomeric materials above, suggest that epoxy oligomers would be useful because of their rapid cure rates and ability to provide high gloss. However, since the majority of epoxy oligomers have rather high viscosity at room temperature (e.g., 10,000–150,000 cps.) and Tg about 55°–67° C., for purposes of coatability it is considered necessary to include a low viscosity diluent with a low Tg to insure adequate flexibility. Thus solutions of oligomer in 20 to 40 wt.% di- or trifunctional diluent are useful. In a less complicated formulation, a single oligomer may be chosen such as a tetrafunctional aliphatic polyester with Tg of 0° C. and viscosity at 25° C. of 400–700 cps (Photomer® 5018).

D) Ethylenically unsaturated acidic precursor

The acidic precursor functions to further enhance the electrical conductivity of the polymeric material. Typical acid precursors which are useful in forming the polymeric material of this invention include, but are not intended to be limited thereby, acrylic acid, itaconic acid, β-carboxyethylacrylate, 2-(acryloyloxy)ethyl-o-phthalate, 2-(acryloyloxy)ethylmaleate, 2-(acryloyloxy)ethylsuccinate, 2-(methacryloyloxy)ethylsuccinate, 2-(methacryloyloxy)ethyl-maleate, and 2-(acryloyloxy)propylmaleate; and carboxylated additives having acid nos. of 100 to 900, such as Ebecryl® 169 and Ebecryl® 170. The acidic maleate and succinate acrylic precursors have the structure:

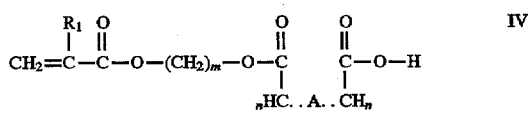

IV wherein $R_1$ is H, methyl, or ethyl; m is an integer from 1 to 4; ..A.. is a carbon-carbon double bond or single bond, wherein when ..A.. is a double bond n is 1 and when ..A.. is a single bond n is 2; are particularly useful precursors in the preparation of the polymeric materials of this invention. Preferred acidic precursors are the low molecular weight acidic acrylic precursors, β-carboxyethylacrylate and 2-(acryloyloxy)-ethylmaleate. When an acidic precursor is used in the preparation of the polymeric material, about 6 to 60 weight parts of the acidic precursor moiety typically are present in the polymer.

E) Other monofunctional precursor

The other monofunctional precursor contains one polymerizable, ethylenically unsaturated functional group and functions to further adjust the properties of the polymer, e.g., flexibility and glass transition temperature, as well as a polymerizable co-solvent for the components of the liquid polymerizable mixture used to form the polymeric material. The term "other monofunctional precursor" as used herein, is intended to exclude the ammonium precursors, organosilicone precursors and acidic precursors each of which may also contain only one polymerizable, ethylenically unsaturated functional group. The other monofunctional precursor typically is a low viscosity liquid. When the polymerizable mixture is to be coated as a solution, the other monofunctional precursor typically contains a hydrophilic group. Typical other monofunctional precursors which are useful in forming the polymeric material of this invention include, but are not intended to be limited thereby, N-vinyl pyrrolidone, 2-hydroxyethylacrylate, tetrahydrofurfurylacrylate, 2-hydroxyethylmethacrylate, tetrahydrofurfurylmethacrylate, 2-hydroxypropylacrylate, 2-(2-ethoxyethoxy)ethylacrylate, 2-cyanoethylacrylate, and 2-hydroxypropylmethacrylate. When an other monofuctional precursor is used in the preparation of the polymeric material, about 10 to 50 weight parts of the other monofunctional precursor moiety typically are present in the polymer.

The scope of this invention is very broad since there are several quaternary salt precursors available as well as numerous di, tri, and tetrafunctional crosslinker precursors in addition to several generic classes of oligomers, i.e., polyester, polyether, polyurethane and polyepoxies. There are innumerable combinations of precursors that will conform to the invention as long as a quaternary salt precursor and an acrylated silicone precursor, especially an acrylated silicone polyether surfactant, are included in the formulation. The number of components in the mix recipe is unrestricted except for the condition that a quaternary salt precursor, and an acrylated silicone precursor must be included. The particular choices of ingredients will be determined by the specific combination of properties desired in the cured electrically conductive release coating, i.e., level of resistivity, flexibility, release characteristics, need to overcoat with a different lacquer composition and, cure rate.

Polymer Preparation

The electrically conductive polymeric release material is prepared by curing the liquid precursor mixture using any conventional coating, molding or spinning method to form the coated, molded, or fiber product desired. The preparation of this polymeric material will be described hereinafter in the context of a coated substrate, but is not intended to be limited thereby. As used herein the term "cure" is intended to encompass polymerization and crosslinking of ethylenically unsaturated components by the free radical addition process.

The polymerizable mixture may contain a photoinitiator to facilitate copolymerization. When the liquid polymerizable mixture is to be cured by irradiation with ultraviolet (UV) radiation, the mixture may contain a free radical generating, initiating system activatable by UV radiation. Suitable photoinitiating systems have been described in "Photo-initiators for Free-Radical-Initiated Photoimaging Systems," by B. M. Monroe and G. C. Weed, Chem. Rev., 93,435–448 (1993) and in "Free Radical Polymerization" by K. K. Dietliker, in Chemistry and Technology of UV and EB Formulation for Coatings, Inks, and Paints, P. K. T. Oldring, ed, SITA Technology Ltd., London, 1991, Vol. 3, pp. 59–525, incorporated herein by reference.

Preferred free radical photoinitiating compounds include benzophenone; 2-hydroxy-2-methyl-1-phenyl-propan-1-one (Darocur® 1173); 2,4,6-trimethylbenzolyl-diphenylphosphine oxide (Lucerin® TPO); 2,2-dimethoxy-2-phenylacetophenone (Irgacure® 651); 2-methyl-1-[4-(methylthio)phenyl]-2-morpholinopropanone-1 (Irgacure® 907); 1-hydroxycyclohexylphenyl ketone (Irgacure® 184); bis(2,6-dimethoxybenzolyl)-2,4,4-trimethylpentyl-phosphine oxide; and combinations thereof. Preferred mixed photoinitiators include a 50:50 blend of 2-hydroxy-2-methyl-1-phenyl-propan-1-one and 2,4,6-trimethylbenzolyldiphenylphosphine oxide (Darocur® 4265); and a 25:75 blend of bis(2,6-dimethoxybenzolyl)-2,4,4-trimethylpentylphosphine oxide and 2-hydroxy-2- methyl-1-phenyl-propan-1-one (CGI-1700). Typically, the liquid photopolymerizable mixture contains about 1 to 5 or more weight parts of the initiating system based on the weight of the mixture. When the liquid polymerizable mixture is to be cured by irradiation with an electron beam, no such initiating system is required.

The liquid mixtures are coatable by a wide variety of well known techniques such as: laboratory manual coating and full scale production machine coating including coating with wire wound or smooth (#0) Mayer rods; by direct gravure or offset gravure which are especially useful for depositing very low coating weight in the order of 0.2 to 5 g/m$^2$; or by roll, slot, spray, dip or curtain coating or the like. The liquid mixtures are coatable on a wide variety of well known substrate materials such as polymeric films, metal surfaces, paper, foraminous materials and the like, and the substrate may be in sheet or web form. The substrate may also be a solid three dimensional object. Although the viscosity of the liquid mixture may vary widely depending on the coating method, typically acceptable coating viscosity ranges from about 300 to about 2000 cps at 25° C.

The polymerization or cure is accomplished by exposing the photoinitiator containing coating to intense ultraviolet light sources such as those available from AETEK International, Plainfield, Ill., or Fusion U.V. Curing Systems, Inc., Rockville, Md. Exposure can be accomplished either in sheet form as in the AETEK laboratory units, or in continuous web form as on production scale coating machines having an ultraviolet curing station following the coating head. The conditions to obtain complete dry-to-touch through cure will depend upon a number of factors such as ammonium precursor choice and amount, oligomer content, crosslinking precursor concentration, other polymerizable component choice and content, photoinitiator choice and concentration, coating thickness, line speed and lamp intensity, whether or not an inert atmosphere is employed, or megarad dose if electron beam cured.

The liquid precursor mixture typically is coated as a solution or a dispersion. In some instances, a coupling solvent can be added to form a solution, if necessary. Using these coating methods, an electrically conductive, polymeric layer may be formed having tailored optical and surface release properties. In particular, the cured coating has a surface with a preselected electrical resistance between about $1 \times 10^5$ ohm/□ and $1 \times 10^{12}$ ohm/□ and a preselected release property.

When the liquid mixture is coated as a dispersion the coated dispersion typically is hazy. Surprisingly, the coated dispersion, upon curing, typically forms a visually transparent, continuous, defect-free, polymeric film. This method comprises the steps, in the order given:

A) preparing a homogeneous, liquid dispersion of two or more immiscible, ethylenically unsaturated, addition polymerizable precursors, wherein at least one of the precursors is a liquid, and wherein the precursors comprise, based on 100 weight parts of the total precursor content: (a) 1 to 80 weight parts of a polymerizable, ethylenically unsaturated ammonium precursor; (b) 0.1 to 10 weight parts of a polymerizable, ethylenically unsaturated, organo-silicone precursor; (c) 5 to 95 weight parts of a multifunctional polymerizable precursor containing at least two polymerizable, ethylenically unsaturated functional groups, wherein the multifunctional polymerizable precursor is a multifunctional monomeric material, an oligomeric material or a combination thereof; (d) 0 to 60 weight parts of a polymerizable, ethylenically unsaturated acidic precursor containing at least one carboxylic acid group; and (e) 0 to 50 weight parts of an other monofunctional precursor containing one polymerizable, ethylenically unsaturated functional group; and wherein the compounds are mixed to form the stable, homogeneous, liquid dispersion;

B) forming a liquid layer of the liquid dispersion;

C) curing the liquid layer to form a cured polymeric layer which is solid and transparent.

The homogeneous, liquid dispersion typically should be a stable dispersion to provide widest storage latitude before and during formation of the cured coating. In addition, metastable dispersions may be used when separation time of the components is in hours and the dispersion is stirred before and during coating.

In some instances the liquid mixture may be coated as a solution of the mixture components. In such an instance, typically about up to about 40 weight parts of the fugitive coupling solvent may be added to the liquid mixture. The term "fugitive coupling solvent" as used herein is intended to mean water, a water miscible organic solvent, or a mixture thereof, which is lost after the cure. This solution method of forming the polymeric layer comprises the steps, in the order given:

A) preparing a liquid solution of two or more immiscible, ethylenically unsaturated, addition polymerizable precursors, wherein at least one of the precursors is a liquid, and wherein the precursors comprise, based on 100 weight parts of the total precursor content, (a) 1 to 80 weight parts of a polymerizable, ethylenically unsaturated ammonium precursor; (b) 0.1 to 10 weight parts of a polymerizable, ethylenically unsaturated, organo-silicone precursor; (c) 5 to 95 weight parts of a polyfunctional monomeric material containing at least two polymerizable, ethylenically unsaturated functional groups; (d) 0 to 60 weight parts of a polymerizable, ethylenically unsaturated acidic precursor containing at least one carboxylic acid group; and (e) 0 to 50 weight parts of an other monofunctional precursor containing a polymerizable, ethylenically unsaturated functional group; and wherein the precursors are mixed with 0 to 40 weight parts of a coupling solvent, to form the liquid solution;

B) forming a liquid layer of the liquid solution;

C) curing the liquid layer to form a cured polymeric layer which is solid, transparent. Unlike solvent based coating solutions where the solvent forms a major component of the solution, the coating solutions of this invention require only a limited amount of coupling solvent to render the liquid components miscible to form a single phase solution. Typically, the coupling solvent is removed from the layer(s) concurrent with step C, or subsequent thereto. Water miscible, organic coupling solvents useful in this coating method include diethylene glycol mono ethyl ether, diethylene glycol monobutyl ether, tetrahydrofurfurylalcohol, γ-butyrolactone, 1-methoxy-2propanol and combinations thereof.

Typically the liquid layer of polymerizable compounds is formed on a substrate surface, cured thereon, and is permanently adhered thereto. Alternatively, the liquid layer may be cast quite thick, e.g., 0.05 mm, and polymerized in which case it can be self supporting.

The methods described supra are particularly useful in preparing a cured polymeric layer on an insulating substrate wherein the layer has a thickness between about 1 to 20 microns, and has an electrical resistance between about $1 \times 10^5$ ohm/□ and about $1 \times 10^8$ ohm/□. Such layers are particularly useful in the manufacture of electrographic and electrostatic elements. Alternatively, the polymerizable compound mixture may be tailored to provide an antistatic coating wherein the layer would have an electrical resistance between about $1 \times 10^5$ ohm/□ and about $1 \times 10^{12}$ ohm/□.

These methods are also useful in preparing a polymeric layer with a glossy surface. Typically the glossy surface reflects about 70%, or more, of visible light incident on the glossy surface at an angle of about 75° or more. Although the coating methods of this invention are particularly useful in forming high gloss polymeric layers, matte surfaces may likewise be formed by conventional methods such as embossing the polymer surface with a matte relief or by adding a conventional matting agent to the liquid mixture prior to coating.

A matte surface can also be obtained by including in the composition particles sufficiently large to give surface irregularities to the layer. Particles of average diameter of about 1 μm to about 15 μm are suitable. Typically 1% to 20% by weight, preferably 5% to 15% by weight, of matting agent is present in the composition. A preferred matting agent is amorphous silica.

The electrically conductive polymeric materials of this invention and their use as release coatings are further illustrated by the following examples, but is not intended to be limited thereby. In the following examples, unless otherwise designated therein: test measurement procedures used are the same as described in the section "Polymer Characterization", supra; and component concentrations are given in either "grams" (g) or "parts" (parts-by-weight based on the total weight of the composition).

EXAMPLE 1

An illustration of the inherent problems can be found in the following example. A 53.75 g quantity of the commercial 50 wt.% aqueous solution of methacrylamidopropyltrimethylammonium chloride (MAPTAC) was mixed with 100 g of n-propanol and then stripped of water and solvent in a rotary evaporator. The 35.43 g of clear fluid recovered must contain 26.87 g of the quaternary precursor. When 38.46 g of the quaternary fluid was mixed with 28.47 g of 2-hydroxypropylacrylate (2-HPA), 9.49 g of trimethylolpropanetriacrylate (TMPTA) and 3.79 g (6% on N.V.) of Darocur® 1173 photoinitiator, a clear low viscosity coating solution was obtained. When this solution was coated using a #16 Mayer rod onto a conductivized paper sheet, i.e., DR base paper (Otis Specialty Papers, Jay, Maine) and cured using two passes at 100 ft/min (about 50 cm/sec) under two 300 watts/inch mercury lamps in an RPC laboratory U.V. processor, the coating was found to be well cured on the first pass and very glossy. However, 610 tape release was difficult. When the remaining 67.2 g of coating mix (50.0 g N.V.) was modified with 0.50 g of RC-726 acrylated siloxane (Th. Goldschmidt AG), the mix became hazy. Ethyl acetate (10 g) was added to the coating mix to improve compatibility before coating and again curing with two passes at 100 ft/min (about 50 cm/sec) with both lamps at 300 watts/inch (about 120 watts/cm). The cured coating was again glossy and now released 610 tape well but had an orange-peel appearance characteristic of marginal surface chemistry.

EXAMPLE 2

Since the potential compatibility problem in Example 1 had only been minimized by first removing water from the quaternary precursor, another procedure seemed more desirable. Solubility studies were made that resulted in the finding that a clear coating solution was obtained from the following components:

| Grams | Component |
|---|---|
| 6.0 | 50 wt. % aq. MAPTAC |
| 5.0 | 2-hydroxyethylacrylate, (2-HEA) |
| 2.0 | Pentaerythritoltriacrylate, (PETA) |
| 4.0 | Dowanol ® PM |
| 1.0 | Ebecryl ® 350 acrylated silicone |
| 0.6 | Darocur ® 1173 |

When coated on a conductivized paper sheet and cured as before, this recipe produced a film surface that had very easy 610 tape release, surface resistivity of $1.5$–$2.0 \times 10^6 \Omega/\square$ (the base paper alone was $2.5 \times 10^6 \Omega/\square$) and gloss of 77% at 75°.

EXAMPLE 3

A stable clear coating was prepared from the following components:

| Grains | Component |
|---|---|
| 7.50 | 2-acryloyloxyethyltrimethylammonium chloride 80% conc. in water (CPS Chemical Co.) |
| 10.0 | 2-hydroxypropylacrylate |
| 4.0 | Pentaerythritoltriacrylate |
| 1.2 | Darocur ® 1173 |
| 0.11 | Ebecryl ® 350 acrylated silicone |
| 3.5 | Water |
| 2.0 | Butyl Carbitol ® |

When coated with a #0 Mayer rod onto DR base paper (resistivity $2.0 \times 10^6 \Omega/\square$, TAPPI conditions) and cured with two passes at 100 ft/min (about 50 cm/sec) using two 300 watts/inch (about 120 watts/cm) mercury lamps, there was obtained a glossy, dry, tack-free coating that under TAPPI conditions had resistivity of $5.3 \times 10^5 \Omega/\square$ and readily released 610 tape.

The same coating solution coated onto non-conductive polyethyleneglycolterephthalate film (PET) using a #36 Mayer Rod, upon three passes at 100 ft/min (about 50 cm/sec) using two 300 watts/inch (about 120 watts/cm) mercury lamps, a dry, glossy transparent coating 0.056 mm thick was obtained having a resistivity of $5.3 \times 10^5 \Omega/\square$ under TAPPI conditions.

EXAMPLE 4

A very nearly clear coating solution was prepared from the following components:

| Grams | Component |
|---|---|
| 7.50 | 2-acryloyloxyethyltrimethylammonium chloride 80% conc. in water (CPS Chemical Co.) |
| 2.0 | Pentaerythritoltriacrylate |
| 4.0 | N-vinyl pyrrolidone |
| 0.16 | Ebecryl ® 350 acrylated silicone |
| 0.75 | Darocur ® 1173 |
| 2.0 | Butyl Carbitol |

When coated on DR base sheet with a #14 Mayer Rod and given two passes at 100 ft/min (about 50 cm/sec) under two 400 watts/inch (about 160 watts/cm) mercury lamps, the cured coating exhibited a 94% gloss at 75°, a surface resistivity of $0.7$–$0.8 \times 10^6 \Omega/\square$ and good, complete 610 tape release.

EXAMPLE 5

This example illustrates that some combinations of water miscible precursors, like N-vinyl pyrrolidone, that are immiscible with concentrated aqueous quaternary precursors, can be used if limited dilution with water is made and surfactant type acrylated siloxanes used both for release and dispersion. A coating mixture was prepared from the following components:

| Grams | Component |
|---|---|
| 7.5 | 2-acryloyloxyethyltrimethylammonium chloride 80% AOETAC in water (Ageflex ® FA1Q80MC) |
| 2.0 g. | N-vinyl pyrrolidone |
| 6.0 g. | Pentaerythritoltriacrylate |
| 6.0 g. | 2-ethoxyethoxyethylacrylate |
| 1.2 g. | Darocur ® 1173 photoinitiator |
| 0.16 g. | Ebecryl ® 350 acrylated siloxane |
| 2.0 g. | Water |

The mixture was thoroughly shaken to obtain a dispersion which was coated on the DR base paper with a #6 Mayer rod and cured with two 100 ft/min (about 50 cm/sec) passes under 400 watts/inch (about 160 watts/cm) mercury lamps. The cured coating had a gloss of 89–92% at 75°, surface resistivity of $1.5–2.0\times10^6\Omega/\square$ and gave easy 610 tape release.

Comparative Example

Representative miscibility tests carried out with 10.0 g aliquots of 2-acryloyloxyethyltrimethylammonium chloride (AOETAC), and 5.0 g and 10.0 g additions of various precursors illustrate compatibility problems encountered and the utility of the partial solubility parameter, $67_p$, in making selections.

| | Precursor Component | | $\delta_p$ |
|---|---|---|---|
| 1. | 2-hydroxyethylacrylate | miscible | 5.75 |
| 2. | 2-hydroxyethylmethacrylate | miscible | |
| 3. | 2-hydroxypropylacrylate | miscible | 5.5 |
| 4. | 2-cyanoethylacrylate | miscible | 6.25 |
| 5. | Acrylic acid | miscible | |
| 6. | β-carboxyethylacrylate | miscible | |
| 7. | N-vinyl pyrrolidone | immiscible | 2.6 |
| 8. | Tetrahydrofurfurylacrylate | immiscible | |
| 9. | 2-ethoxyethoxyethylacrylate | immiscible | |
| 10. | Ethylacrylate | immiscible | |
| 11. | n-butylacrylate | immiscible | 3.8 |
| 12. | 2-ethylhexylacrylate | immiscible | 3.27 |

Further miscibility tests between the acrylated release additives and various ultaviolet curable precursors illustrate, in conjunction with the preceding data, the severity of the incompatibility problem that must be resolved. In the following table "+" denotes miscible and "−" denotes immiscible:

| | Acrylated Release Additive | | |
|---|---|---|---|
| Precursor Component | RC-726 | Ebecryl ® 350 | Ebecryl ® 1360 |
| 2-ethylhexylacrylate | + | + | + |
| n-butylacrylate | + | + | + |
| laurylmethacrylate | + | + | + |
| N-vinyl pyrrolidone | − | + | + |
| Tetrahydrofurfurylacrylate | − | + | + |
| Ageflex ® FA1Q80MC quaternary | − | − | − |

It is clear that Ageflex® FA1Q80MC quaternary is immiscible in each of the acrylated release additives. However it was discovered that Ebecryl® 350 becomes soluble in the Ageflex quaternary if the quaternary is diluted with water.

EXAMPLE 6

This example illustrates use of a dispersion not employing extra water to provide a clear thin conductive release layer. A coating mixture was prepared from the following components:

| Grams | Component |
|---|---|
| 7.5 | Ageflex ® FA1Q80MC quaternary salt precursor |
| 6.0 | Tetrahydrofurfurylacrylate |
| 6.0 | Pentaerythritoltriacrylate |
| 2.0 | N-vinylpyrrolidone |
| 1.2 | Darocur ® 1173 containing 10% benzophenone |
| 0.32 | Ebecryl ® 350 acrylated siloxane |

Zero Mayer rod coatings on DR base paper were cured under two 400 watts/inch (about 160 watts/cm) mercury lamps at 100 ft/min (about 50 cm/sec) to obtain coatings with 80% gloss at 75°, a surface resistivity of $2.5–4.5\times10^6\Omega/\square$ and easy 610 tape release. By comparison a dielectric coating of similar thickness on DR base paper would have surface resistivity of $10^{10}\Omega/\square$.

This same recipe also performed well when Ebecryl® 350 is replaced with 0.45 g of Ebecryl® 1360 acrylated siloxane or a mixture of 0.43 g RC-726 plus 0.20 g Silwet® XL-7602 surfactant (OSI Specialties).

EXAMPLE 7

This example illustrates the simultaneous use of more than one surfactant type acrylated silicone to improve dispersion stability. A coating mixture was prepared from the following components:

| Grams | Component |
|---|---|
| 7.5 | Ageflex ® FA1Q80MC quaternary |
| 6.0 | Tetrahydrofurfurylacrylate |
| 6.0 | Pentaerythritoltriacrylate |
| 2.0 | N-vinylpyrrolidone |
| 1.2 | Darocur ® 1173 with 10% benzophenone |
| 0.20 | Ebecryl ® 350 acrylated silicone |
| 0.20 | Ebecryl ® 1360 acrylated silicone |

Zero Mayer rod coatings on DR base paper were given two passes beneath two 400 watts/inch (about 160 watts/cm) mercury lamps at 100 ft/min (about 50 cm/sec) to obtain dry, glossy coating with surface resistivity of $2.5\times10^6\Omega/\square$.

EXAMPLE 8

This example illustrates the use of acrylated oligomers to increase cure speed as well as to control substrate penetration of the coating mixture by increasing mix viscosity. A coating mixture was prepared from the following components:

| Grams | Component |
|---|---|
| 3.75 | Ageflex ® FA1Q80MC quaternary |
| 2.5 | Pentaerythritoltriacrylate |
| 4.5 | Photomer ® 5018 acrylated polyester oligomer |
| 0.60 | Darocur ® 1173 containing 10% benzophenone |
| 0.20 | Ebecryl ® 350 acrylated silicone |

This dispersion was coated onto DR base paper with a #0 Mayer rod and cured with a single pass under two 400 watts/inch (about 160 watts/cm) mercury lamps at 450 ft/min (about 225 cm/sec) to obtain a dry, glossy coating having a surface resistivity of $0.5 \times 10^6 \Omega/\square$.

EXAMPLE 9

This example illustrates use of more than one oligomer allowing selection of glass transition temperatures and viscosities to optimize the cure rate, substrate penetration, and film flexibility. A coating mixture was prepared from the following components:

| Grams | Component |
|---|---|
| 7.5 | Ageflex ® FA1Q80MC quaternary precursor |
| 4.0 | Trimethylolpropane ethoxylate triacrylate |
| 5.0 | Ebecryl ® 1608 epoxy oligomer |
| 5.0 | Photomer ® 5018 ester oligomer |
| 1.2 | Darocur ® 1173 containing 10% benzophenone |
| 0.8 | Evecryl ® 1360 acrylated silicone |

Zero Mayer rod coatings were made on DR base paper and cured in one pass at 450 ft/min (about 225 cm/sec) under two 400 watts/inch (about 160 watts/cm) mercury lamps to yield dry films having a surface resistivity of $2-3 \times 10^6 \Omega/\square$ and excellent gloss and 610 tape release.

EXAMPLE 10

This example illustrates the influence of the surfactant-like acrylated silicone on the coating mix viscosity. A coating mixture was prepared from the following components:

| Grams | Component |
|---|---|
| 33.04 | Ageflex ® FA1Q80MC |
| 17.62 | TMPEOTA |
| 22.02 | Ebecryl ® 1608 |
| 22.02 | Photomer ® 5018 |
| 5.28 | Darocur ® 1173 with 10% benzophenone |
| 1.76 | Surfactant-like acrylated silicone |

The surfactant-like acrylated silicone was Ebecryl® 350, Ebecryl® 1360, or a 50:50 (by weight) mixture of Ebecryl® 350 and Ebecryl® 1360. Viscosities were determined using a conventional Brookfield viscometer with spindle #3, at 30 rpm and f=40×. Coating mixture viscosities for each acrylated silicone is given in the following table:

| Acrylated Silicone | Viscosity (cp) |
|---|---|
| Ebecryl ® 350 | 1660 |
| 50:50 Ebecryl ® 350/Ebecryl ® 1360 | 2440 |
| Ebecryl ® 1360 | 2740 |

EXAMPLE 11

This example illustrates the properties of a 0.058 mm thick (#36 Mayer Rod) coating on PET when no carboxylated precursor is used.

| Grams | Component |
|---|---|
| 33.04 | Ageflex ® FA1Q80MC quaternary precursor |
| 17.62 | Trimethylolpropane ethoxylate triacrylate |
| 22.02 | Ebecryl ® 1608 epoxy oligomer |
| 22.02 | Photomer ® 5018 ester oligomer |
| 5.28 | Darocur ® 1173 |
| 2.80 | Ebecryl ® 350 acrylated silicone |

The dispersion was coated on 0.007 inch (about 180 micron) thick PET and cured with two passes at 450 ft/min (about 225 cm/sec) under two 300 watts/inch (about 120 watts/cm) mercury lamps. The coating was dry-to-touch, glossy, slightly hazy though quite transparent, released 610 tape easily and under TAPPI conditions had a resistivity of $2.5 \times 10^8 \Omega/\square$.

EXAMPLE 12

The acrylated precursor mono(2-methacryloyloxyethyl) maleate is synthesized from maleic anhydride and 2-hydroxyethylacrylate by the following process. A mixture of 98.1 g of 99% maleic anhydride (Aldrich Chemical) and 116.2 g of 96% 2-hydroxyethylacrylate (Aldrich Chemical) were warmed to 75° C. The maleic anhydride dissolved rapidly and the solution was held at 75° C. for 16 hours. An infrared spectrum indicated only a trace of unreacted maleic anhydride so the product was used without further purification. This reaction product had an acid number of 261.9. By replacing maleic anhydride with succinic anhydride in an analogous synthesis, the precursor mono-(2-methacryloyloxyethyl)succinate may be obtained.

This process can also be used to synthesize other useful carboxylated radical polymerizable precursors by using combinations of 2-hydroxyethylmethacrylate or the corresponding 2-hydroxypropyl esters with maleic, succinic, o-phthalic, or cyclohexene-1,2-dicarboxylic anhydride.

EXAMPLE 13

This example illustrates the large enhancement of coating conductivity that results when a carboxylated precursor such as mono(2-acryloyloxyethyl)maleate replaces the trifunctional TMPEOTA in an oligomer recipe. A coating mixture was prepared from the following components:

| Grams | Component |
|---|---|
| 33.04 | Ageflex ® FA1Q80MC |
| 17.62 | Maleate of Example 11 |
| 22.02 | Ebecryl ® 3200 |
| 22.02 | Ebecryl ® 810 |
| 5.28 | Darocur ® 1173 and 10% benzophenone |
| 0.88 | Ebecryl ® 350 |
| 0.88 | Ebecryl ® 1360 |

Three coating samples were made with a #20 Mayer rod on 7 mil (about 180 micron) thick PET sheet and cured at 200 ft/min (about 100 cm/sec) under two 400 watts/inch (about 160 watts/cm) mercury lamps. Surface resistivity of the three samples was $6 \times 10^5 \Omega/\square$, $7-8 \times 10^5 \Omega/\square$, and $6 \times 10^5 \Omega/\square$ respectively.

In contrast, the same component mixture using TMPEOTA in place of the maleate when coated and cured in identical fashion had a surface resistivity of $4 \times 10^7 \Omega/\square$, almost one hundred times greater than the maleate formulation. When coated using a #36 rod, the surface resistivity of the TMPEOTA formulation was $1.1-2.5 \times 10^8 \Omega/\square$.

Resistivity measurements performed in this example were with a two bar 6.0"×6.0" (15.24 cm×15.24 cm) )probe connected to a Fluke 8060A True RMS Multimeter and using samples cut to the outside dimensions of the square probe.

The same enhancement can be observed using β-carboxyethylacrylate, mono(2-methacryloyloxyethyl) maleate or mono(2-methacryloyloxyethyl)succinate.

EXAMPLE 14

This example illustrates use of a carboxylated acrylic precursor to increase the conductivity of the cured coating. A coating mixture was prepared from the following components:

| Parts | Component |
|---|---|
| 33.04 | Ageflex ® FA1Q80MC |
| 17.62 | β-carboxyethylacrylate |
| 17.62 | TMPEOTA |
| 22.02 | Ebecryl ® 1608 |
| 4.42 | Photomer ® 5018 |
| 5.28 | Darocur ® 1173 and 10% benzophenone |
| 0.93 | Ebecryl ® 350 |

A smooth (#0) Mayer rod coating on DR base paper was cured in a single pass at 300 ft/min (about 150 cm/sec) under two 400 watts/inch medium pressure mercury lamps in a laboratory RPC U.V. processor.

The surface resistivity for two sheets of the paper supported coating was $0.7 \times 10^6 \Omega/\square$ and $0.8 \times 10^6 \Omega/\square$. When tested with 610 tape, the coatings allowed complete and easy release.

EXAMPLE 15

This example illustrates use of a carboxylated precursor in conjunction with a quaternary salt conductivizing agent. A coating mixture was prepared from the following components:

| Parts | Component |
|---|---|
| 33.04 | Ageflex ® FA1Q80MC |
| 17.62 | β-carboxyethylacrylate |
| 17.62 | TMPEOTA |
| 4.42 | Photomer ® 5018 |
| 22.02 | Ebecryl ® 1608 |
| 5.28 | Darocur ® 1173 and 10% benzophenone |
| 2.80(3%) | Ebecryl ® 350 |
| 1.87(2%) | Ebecryl ® 1360 |

The dispersion was coated onto DR base paper with a smooth (#0) Mayer Rod and cured dry in one pass at 300 ft/min (about 150 cm/sec) under two 300 watts/inch (about 120 watts/cm) mercury lamps in an RPC laboratory U.V. processor.

Mix Viscosity: 440 Centipoise

Resistivity: $0.6 \times 10^6 \Omega/\square$

Peel Force: 15–25 grams per inch

EXAMPLE 16

This example illustrates and compares the properties of a transparent, glossy, conductive release coating on conductive and non-conductive substrates. A coating mixture was prepared from the following components:

| Parts | Component |
|---|---|
| 33 | Ageflex ® FA1Q80MC |
| 20 | β-CEA |
| 20 | TMPEOTA |
| 22 | Ebecryl ® 1608 |
| 5.3 | Darocur ® 1173 (10% dissolved benzophenone) |
| 1.0 | Ebecryl ® 350 |

Each sample was coated with a smooth (#0) Mayer rod and cured with a single pass at 300 ft/min (about 150 cm/sec) under two 400 watts/inch (about 160 watts/cm) mercury lamps in an RPC laboratory U.V. processor. Surface resistivity measurements made on uncoated substrate material and the coated substrate are compared as follows:

| | RESISTIVITY ($\Omega/\square$) | |
|---|---|---|
| Substrate | Uncoated | Coated |
| 7 mil PET film* | $4.0 \times 10^{11}$ | $1.1 \times 10^6$ |
| DR paper | $2.5 \times 10^6$ | $0.8 \times 10^6$ |
| Potlatch Northwest Glossy Text Paper | $1–1.5 \times 10^{10}$ | $2–2.4 \times 10^6$ |
| Champion 60 lb. Litho paper | $1.0 \times 10^{10}$ | $2.4 \times 10^6$ |

*This coating was prepared with a #36-Mayer rod.

These measurements indicate that surface conductivity of each substrate has been increased by the coating to provide a surface resistivity in the megohm/square range or less.

| DR paper | 97% |
|---|---|
| Northwest Glossy Text | 97% |
| Champion Litho | 95% |

All samples released 610 tape completely and easily.

EXAMPLE 17

This example illustrates the use of a high concentration of dimethylsulfate quaternary salt in a solution mix achieved by addition of water only.

| Grams | Component |
|---|---|
| 8.0 | 2-methacroyloxyethyltrimethylammonium methosulfate as Ageflex ® FA1Q80MS |
| 6.0 | 2-hydroxyethylacrylate |
| 4.0 | Pentaerythritoltriacrylate |
| 1.2 | Darocur ® 1173 |
| 0.11 | Ebecryl ® 350 acrylated silicone |
| 2.0 | Water |

The clear solution was coated onto DR base paper with a #0 Mayer rod and cured with two passes under two 300 watts/inch (about 120 watts/cm) mercury lamps at 100 ft/min (about 50 cm/sec). The cured coatings were very glossy, released 610 tape readily, and had a surface resistivity of $5 \times 10^5 \Omega/\square$. On polyester, a #36 Mayer Rod coating cured in like manner was glossy, transparent, and had a surface resistivity of $4.5–7.0 \times 10^5 \Omega/\square$.

The quaternary content of this mix recipe calculated excluding the fugitive water content and the indeterminate weight of photoinitiator residue is 36.76% by weight.

EXAMPLE 18

This example illustrates use of a moderately high weight level of quaternary salt precursor, i.e., 60 wt.%. It should be noted that the quoted quaternary percentage excludes fugitive water content and the photoinitiator since it can be used in varying amounts and an indeterminate amount of its decomposition products is volatile. A coating mixture was prepared from the following components:

| Parts | Component |
| --- | --- |
| 7.5 | Ageflex ® FA1Q80MC |
| 2.0 | TMPEOTA |
| 2.0 | β-carboxyethylacrylate |
| 0.50 | Darocur ® 1173 |
| 0.10 | Ebecryl ® 350 |
| 0.10 | Ebecryl ® 1360 |

The hazy dispersion was coated onto DR base paper with a #0 Mayer Rod and cured in the RPC U.V. processor with two passes at 100 ft/min (about 50 cm/sec) under two 300 watts/inch (about 120 watts/cm) mercury lamps. The coating was glossy though somewhat "orange peeled" and under TAPPI conditions it had a resistivity of $0.8 \times 10^5 \Omega/\square$. The coating readily released 610 tape.

EXAMPLE 19

This example illustrates the use of a very high weight level of quaternary salt precursor. A coating mixture was prepared from the following components:

| Parts | Component |
| --- | --- |
| 10.0 | Ageflex ® FA1Q80MC |
| 2.0 | 2-methacryloloxyethylmaleate |
| 0.50 | Darocur ® 1173 |
| 0.10 | Ebecryl ® 350 |
| 0.10 | Ebecryl ® 1360 |

The hazy dispersion was coated onto DR base paper with a #0 Mayer Rod and cured in the RPC U.V. processor with two passes at 100 ft/min (about 50 cm/sec) under two 300 watts/inch (about 120 watts/cm) mercury lamps. The glossy coating released 610 tape readily and under TAPPI conditions, had a resistivity of $0.6-0.8 \times 10^5 \Omega/\square$.

EXAMPLE 20

This example illustrates the use of a very high weight level of quaternary salt precursor in a coating on plain paper. A coating mixture was prepared from the following components:

| Parts | Component |
| --- | --- |
| 10.0 | Ageflex ® FA1Q80MC |
| 2.0 | TMPEOTA |
| 0.50 | Darocur ® 1173 |
| 0.10 | Ebecryl ® 350 |
| 0.10 | Ebecryl ® 1360 |

The hazy dispersion was coated onto Champion 60-lb litho paper with a #0 Mayer Rod and cured with two passes at 100 ft/min (about 50 cm/sec) under two 300 watts/inch (about 120 watts/cm) mercury lamps in a RPC U.V. laboratory processor. The coating had a resistivity of $1.3 \times 10^5 \Omega/\square$ under TAPPI conditions.

EXAMPLE 21

This example illustrates the facile polymerization of a typical dispersion lacquer using an electron beam and no photoinitiator. A coating mixture was prepared from the following components:

| Parts | Component |
| --- | --- |
| 264.0 | Ageflex ® FA1Q80MC |
| 160.0 | β-carboxyethylacrylate |
| 160.0 | TMPEOTA |
| 176.0 | Ebecryl ® 1608 |
| 8.0 | Ebecryl ® 350 |
| 8.0 | Ebecryl ® 1360 |

The dispersion was coated onto DR base paper with a #0 Mayer Rod and cured at four increasingly lower dose levels at about 30 ppm oxygen. Even at the lowest dose, a full dry cure was obtained.

| Dose in Megarads | Resistivity ($\Omega/\square$) |
| --- | --- |
| 3 | $0.7-0.8 \times 10^6$ |
| 2 | $0.6-0.8 \times 10^6$ |
| 1 | $0.6-0.8 \times 10^6$ |
| 0.5 | $0.6-0.8 \times 10^6$ |

The uncoated DR base paper has a resistivity of $2.5 \times 10^6 \Omega/\square$ making it apparent that the coated sheet is more conductive by virtue of the conductive release coating.

EXAMPLE 22

This example illustrates use of a gravure coating method to apply the coating mixture prepared from the following components:

| Parts | Component |
| --- | --- |
| 300 | Ageflex ® FA1Q80MC |
| 240 | Pentaerythritoltriacrylate |
| 240 | tetrahydrofurfurylacrylate |
| 80 | N-vinylpyrrolidone |
| 48 | Darocur ® 1173 and 10% benzophenone |
| 8.4 | Ebecryl ® 350 |
| 8.4 | Ebecryl ® 1360 |

A coating of 1 lb/1000 ft² (4.9 g/m²) was applied to DR base paper using the gravure coating method with a 110 trihelical gravure cylinder, and cured under two 300 watts/inch (about 120 watts/cm) Fusion Systems Corp. type H lamps. The coating had a gloss of 85–87% at 75° and under TAPPI conditions, a resistivity of $1.4 \times 10^6 \Omega/\square$. The peel force with 610 tape averaged 250 g/inch (about 100 g/cm).

EXAMPLE 23

This example illustrates the control of release properties via variation of the amount of acrylated silicone surfactant in the coating mixture. Three coating mixtures were prepared from the following components and 2, 3, and 4 percent respectively of Ebecryl® 350:

| Parts | Component |
| --- | --- |
| 33.04 | Ageflex ® FA1Q80MC |
| 17.62 | TMPEOTA |
| 22.02 | Ebecryl ® 1608 |
| 22.02 | Photomer ® 5018 |
| 5.28 | Darocur ® 1173 and 10% benzophenone |
| % | Ebecryl ® 350 |

The three separate dispersions differing only in Ebecryl® 50 content were coated onto DR base paper with a #0 Mayer Rod and cured dry in one pass at 300 ft/min (about 150 cm/sec) under two 300 watts/inch (about 120 watts/cm) mercury lamps in an RPC laboratory U.V. processor.

| Ebecryl® 350 % Used | Resistivity Ω/□ | Gloss % @ 75° | 610 Peel Force (g/inch) |
|---|---|---|---|
| 2 | $5 - 10 \times 10^6$ | 94 | 100–150 |
| 3 | $4 - 7 \times 10^6$ | 91 | 50–75 |
| 4 | $3 - 5 \times 10^6$ | 94 | 25–60 |

EXAMPLE 24

This example illustrates the use of a non-acrylic ethylenically unsaturated free radical polymerizable quaternary salt precursor in the coating mixture. Dimethyldiallylammonium chloride (DMDAC) precursor is used in an amount equimolar to the Ageflex® FA1Q80MC of Example 15 for comparative purposes. A coating mixture was prepared from the following components:

| Parts | Component |
|---|---|
| 36.37 | 60% aq.soln. of DMDAC |
| 20 | β-CEA |
| 20 | TMPEOTA |
| 22 | Ebecryl® 1608 |
| 5.3 | Darocur® 1173 |
| 1.0 | Ebecryl® 350 |

The hazy dispersion was coated onto DR base paper with a #0 Mayer rod and onto PET with a #36 Mayer rod and cured in an RPC laboratory U.V. processor using two 300 watts/inch (about 120 watts/cm) mercury lamps and one pass at 200 ft/min (about 100 cm/sec) and two passes at 100 ft/min (about 50 cm/sec) respectively. The cured coatings were both glossy and dry-to-touch with the PET coating transparent though hazy. Both coatings released 610 tape well. Under TAPPI conditions the paper sample had a resistivity of $5 \times 10^5 \Omega/\square$ and the PET sample had a resistivity of $10 \times 10^6 \Omega/\square$.

EXAMPLE 25

In order to obtain both acceptable cure rate and coating flexibility for specific end uses, it is often necessary to test several crosslinking components of varying moles per kg. to compensate for di or trifunctional diluents used to adjust oligomer viscosity, e.g., final cured film properties in a preferred formulation for electrographic or electrostatic imaging were judged best when trimethylolpropane ethoxylate triacrylate, was used instead of an equal weight of either trimethylolpropanetriacrylate or pentaerythritol-triacrylate.

An illustration of a coating formulation providing a desirable balance of properties for such electrographic or electrostatic imaging is:

| Parts | Parts | Component |
|---|---|---|
| 99.98 | 33.04 | Ageflex® FA1Q80MC |
|  | 17.62 | Trimethylolpropane ethoxylatetriacrylate |
|  | 22.02 | Ebecryl® 1608 |
|  | 22.02 | Photomer® 5018 |
|  | 5.28 | Darocur® 1173 with 10% benzophenone |
| 2.80 |  | Ebecryl® 350 (3 wt. % on N.V.) |

The resulting dispersion, which had a viscosity of 1320 centipoise, was coated using a #0 Mayer rod on DR base paper and cured with one pass at 450 ft/min (about 225 cm/sec) under two 400 watts per inch (about 160 watts/cm) mercury lamps. The coatings gloss measured 91% at 75° and the surface resistivity under TAPPI conditions was 4–7× $10^6 \Omega/\square$.

EXAMPLE 26

This example illustrates the use of two low levels of a quaternary salt precursor to form electrically conductive release coatings having resistivity levels in the antistatic range, i.e., a surface resistivity between about $10^9$ to $10^{14} \Omega/\square$ (the Electronics Industry Standard IS-5 requires a surface resistivity of less than $1.0 \times 10^{13} \Omega/\square$). A first coating mixture was prepared from the following components wherein parts are in grams:

| Parts | Component |
|---|---|
| 6.6 | Ageflex® FA1Q80MC (6.6 wt. % quat.) |
| 33.2 | TMPEOTA |
| 35.2 | Ebecryl® 1608 |
| 5.3 | Darocur® 1173 |
| 1.0 | Ebecryl® 350 |

The coating mixture was coated onto two ICI 583 polyester sheets with a #0 and a #36 Mayer rod respectively and cured under two 350 watts/inch (about 140 watts/cm) mercury lamps at 400 ft/min (about 200 cm/sec) and 200 ft/min (about 100 cm/sec) respectively. The surface resistivities of the transparent dry coatings under TAPPI conditions were measured to be $3 \times 10^9 \Omega/\square$ and $3-5 \times 10^9 \Omega/\square$ respectively.

A second coating mixture was prepared as follows:

| Grams | Component |
|---|---|
| 3.0 | Ageflex® FA1Q80MC (2.97 wt. % quat.) |
| 33.0 | TMPEOTA |
| 39.0 | Ebecryl® 1608 |
| 5.3 | Darocur® 1173 |
| 1.0 | Ebecryl® 350 |

When coated onto ICI 583 polyester sheet with a #0 Mayer rod and cured at 400 ft/min (about 200 cm/sec) as with the first coating mixture, the clear dry coating under TAPPI conditions had a surface resistivity of $1 \times 10^{10} \Omega/\square$.

Cured coatings from both the first and second coating mixtures can be employed to provide antistatic protection to the polyester sheet material.

EXAMPLE 27

This example illustrates a conductive release coating with a glossy finish.

The following composition was prepared and coated onto Otis OLP conductive paper (Otis Specialty Papers, Jay, Me.) by reverse gravure using a laboratory scale web coater. The coating was cured by a exposure to two 300 watts/in (about 120 watts/cm) ultraviolet lamps at a speed of 35–40 ft/min (about 18–20 cm/sec).

| Parts | Component |
|---|---|
| 75 | Ageflex® FA1Q80MC |
| 20 | Ebecryl® 1608 |
| 4 | Darocur® 1173 |
| 1 | Ebecryl® 350 |

Surface resistivity was $3.9 \times 10^6 \Omega/\square$. Gloss was 91%. Sheffield surface roughness was 50 sec/100 mL. Surface energy was about 23 dyne/cm.

EXAMPLE 28

This example illustrates a conductive release coating with a matte finish.

The following composition was evaluated by the procedure described in Example 27. OK 412 is organic surface treated silica, particle size 5.0 to 7.0 microns (Degussa, Ridgefield Park, N.J.).

| Parts | Component |
|---|---|
| 70 | Ageflex ® FA1Q80MC |
| 19 | Ebecryl ® 1608 |
| 4 | Darocur ® 1173 |
| 1 | Ebecryl ® 350 |
| 6 | OK 412 |

Surface resistivity was $5.3 \times 10^6 \Omega/\square$. Gloss at 75° was 27%. Sheffield surface roughness was 80 sec/100 mL. Surface energy was about 23 dyne/cm.

It is understood that there are numerous mix formulations that can be developed to provide useful electrical conductivity in conjunction with useful release characteristics but which may vary in cure speed or holdout (and gloss) on porous substrates. Such formulations may prove useful only under specific circumstances, since, indeed they are optimized with respect to the requirements of the intended end use, however, they must be considered examples of this invention.

Those skilled in the art having the benefit of the teachings of the present invention as hereinabove set forth, can effect numerous modifications thereto. These modifications are to be construed as being encompassed within the scope of the present invention as set forth in the appended claims.

GLOSSARY OF TRADEMARKS AND TRADENAMES

Ageflex® is a trademark for precursor products of CPS Chemical Co., Old Bridge, N.J.
Carbitol® is a trademark for solvent products of Union Carbide Corp., Danbury, Conn.
CGI is an identification of photoinitiator products of Ciba Geigy Corp., Hawthorne, N.Y.
Coat-o-Sil® is a trademark for silicone precursor products of Witco Corp., Greenwich, Conn.
Darocur® is a trademark for photoinitiator products of Ciba Geigy Corp., Hawthorne, N.Y.
Dowanol® is a trademark for solvent products of Dow Chemical Co., Midland, Mich.
Ebecryl® is a trademark for precursor & oligomer products of U.C.B. Radcure Inc., Smyrna, Ga.
Irgacure® is a trademark for photoinitiator products of Ciba Geigy Corp., Hawthorne, N.Y.
Lucerin® is a trademark for photoinitiator products of BASF, Germany.
Photomer® is a trademark for precursor & oligomer products of Henkel Corp., Ambler Pa.
Scotch® is a trademark for products of the 3M Corporation, St. Paul, Minn.
Silwet® is a trademark for silicone surfactant products of Witco Corp., Greenwich, Conn.

What is claimed is:

1. An electrically conductive polymeric release material comprising a polymer which comprises in polymerized form, A) 1 to 80 weight parts of a polymerizable, ethylenically unsaturated ammonium precursor;

B) 0.1 to 10 weight parts of a polymerizable, ethylenically unsaturated, organo-silicone precursor;

C) 5 to 95 weight parts of a multifunctional polymerizable precursor containing at least two polymerizable, ethylenically unsaturated functional groups, wherein the multifunctional polymerizable precursor is a multifunctional monomeric material, an oligomeric material or a combination thereof;

D) 0 to 60 weight parts of a polymerizable, ethylenically unsaturated acidic precursor containing at least one carboxylic acid group; and E) 0 to 50 weight parts of an other monofunctional precursor containing one polymerizable, ethylenically unsaturated functional group;

wherein the polymer has a surface having an electrical resistance between about $1 \times 10^5$ ohm/$\square$ and $1 \times 10^{12}$ ohm/$\square$.

2. The electrically conductive polymeric material of claim 1 wherein the ammonium precursor contains a cation selected from the group consisting of (3-(methacryloylamino)propyl)trimethylammonium, (2-(methacryloyloxy)-ethyl)trimethylammonium, (2-(acryloyloxy)-ethyl)trimethylammonium, (2-(methacryloyloxy)-ethyl)-methyldiethylammonium, 4-vinylbenzyltrimethylammonium, dimethyldiallylammonium and mixtures thereof.

3. The electrically conductive polymeric material of claim 2 wherein the ammonium precursor is 2-(acryloyloxy) ethyltrimethylammonium chloride.

4. The electrically conductive polymeric material of claim 1 wherein the ammonium precursor has one of the structures:

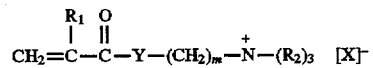

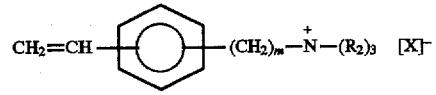

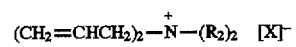

wherein $R_1$ is H, methyl, or ethyl; Y is O or $-NR_3$ wherein $R_3$ is H or a $C_1-C_4$ alkyl; m is an integer from 1 to 4, each $R_2$ individually is a $C_1-C_4$ alkyl group; and $[X]^-$ is an anion.

5. The electrically conductive polymeric material of claim 1 wherein the polymerizable, ethylenically unsaturated, organo-silicone precursor is an acrylated silicone.

6. The electrically conductive polymeric material of claim 1 wherein the polymerizable, ethylenically unsaturated, organo-silicone precursor is an acrylated-oxyalkylene-silicone precursor wherein the alkylene is ethylene, propylene or a combination thereof.

7. The electrically conductive polymeric material of claim 6 wherein the polymerizable, ethylenically unsaturated, organo-silicone precursor additionally contains an acrylated-silicone precursor.

8. The electrically conductive polymeric material of claim 1 wherein the multifunctional monomeric material is selected from the group consisting of trimethylolpropanetriacrylate, pentaerythritoltriacrylate, pentaerythritoltetraacrylate, pentaerythritoltetramethacrylate, ethoxylated trimethylolpropanetriacrylate, glycerol-propoxytriacrylate, ethyleneglycoldiacrylate, tripropylene-glycoldiacrylate, and tetraethyleneglycoldiacrylate.

9. The electrically conductive polymeric material of claim 1 wherein the multifunctional oligomeric material is selected from the group consisting of acrylated urethanes, polyesters, and polyepoxides; and acrylics.

10. The electrically conductive polymeric material of claim 1 wherein the acidic precursor has an acid number between about 100 and about 900.

11. The electrically conductive polymeric material of claim 1 wherein the polymer contains about 10 weight parts or more of the acidic precursor, and wherein the acidic precursor is taken from the group consisting of acrylic acid, itaconic acid, β-carboxyethylacrylate, 2-(acryloyloxy)ethyl-o-phthalate, 2-(acryloyloxy)ethylmaleate, 2-(acryloyloxy)ethylsuccinate, 2-(methacryloyloxy)ethylsuccinate, 2-(methacryloyloxy)ethylmaleate, and 2-(acryloyloxy)propylmaleate.

12. The electrically conductive polymeric material of claim 11 wherein the acidic precursor is β-carboxyethylacrylate.

13. The electrically conductive polymeric material of claim 1 wherein the polymer contains about 10 weight parts or more of the acidic precursor, and wherein the acidic precursor has the structure:

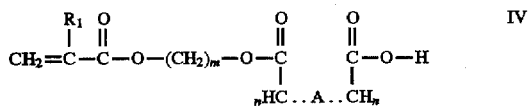

wherein $R_1$ is H, methyl, or ethyl; m is an integer from 1 to 4; ..A.. is a carbon-carbon double bond or single bond, wherein when ..A.. is a double bond n is 1 and when ..A.. is a single bond n is 2.

14. The electrically conductive polymeric material of claim 13 wherein the acidic precursor is 2-(acryloyloxy)ethylmaleate.

15. The electrically conductive polymeric material of claim 1 wherein the polymer contains about 10 weight parts or more of the other monofunctional precursor, and wherein the other monofunctional precursor is selected from the group consisting of N-vinyl pyrrolidone, 2-hydroxyethylacrylate, tetrahydro-furfurylacrylate, 2-hydroxyethylmethacrylate, tetrahydrofurfurylmethacrylate, 2-hydroxypropylacrylate, 2-(2-ethoxy-ethoxy)ethylacrylate, 2-cyanoethylacrylate, and 2-hydroxy-propylmethacrylate.

16. The electrically conductive polymeric material of claim 1 wherein a layer of the polymer, having a thickness between about 10 microns and about 50 microns, coated on an insulating substrate has an electrical resistance between about $1 \times 10^8$ ohm/□ and $1 \times 10^7$ ohm/□.

17. The electrically conductive polymeric material of claim 1 wherein an antistatic layer of the polymer coated on an insulating substrate has an electrical resistance between about $1 \times 10^8$ ohm/□ and $1 \times 10^{12}$ ohm/□.

18. The electrically conductive polymeric material of claim 1 having an exposed surface wherein the exposed surface will not permanently adhere to a supported contact adhesive when applied thereto.

19. The electrically conductive polymeric material of claim 1 having a high-gloss surface wherein the high-gloss surface reflects about 70%, or more, of visible light incident on the surface at an angle of about 75° or more.

20. The electrically conductive polymeric material of claim 1 wherein a layer of the polymeric material, having a thickness about 50 microns, or less, is visually transparent in at least one region within the visible spectral region.

21. The electrically conductive polymeric material of claim 1 additionally comprising a 1 to 20 weight parts of a matting agent, based on the total weight of the polymerizable materials.

22. The electrically conductive polymeric material of claim 21 wherein the matting agent comprises particles of average diameter of about 1 μm to about 15 μm.

23. The electrically conductive polymeric material of claim 21 wherein the matting agent is amorphous silica.

24. The electrically conductive polymeric material of claim 1 wherein the electrically conductive release layer comprises 60 to 80 weight parts of the ethylenically unsaturated ammonium precursor and 0.2 to 2 weight parts of the polymerizable, ethylenically unsaturated, organo-silicone precursor.

25. The electrically conductive polymeric material of claim 24 wherein the ethylenically unsaturated ammonium precursor is:

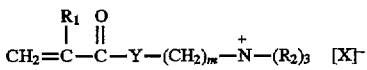

in which $R_1$ is H, methyl, or ethyl; Y is —O— or —($NR_3$)—, wherein $R_3$ is H or a $C_1$–$C_4$ alkyl; m is an integer from 1 to 4, each $R_2$ individually is a $C_1$–$C_4$ alkyl group; and $[X]^-$ is an anion.

* * * * *

UNITED STATES PATENT AND TRADEMARK OFFICE
CERTIFICATE OF CORRECTION

PATENT NO. : 5,707,554

DATED : January 13, 1998

INVENTOR(S) : Everett Wyman Bennett et al.

It is certified that error appears in the above-identified patent and that said Letters Patent is hereby corrected as shown below:

In claim 16, on column 28, line 2, replace "$1 \times 10^8$" with --$1 \times 10^5$--

Signed and Sealed this

Third Day of March, 1998

Attest:

BRUCE LEHMAN

Attesting Officer

Commissioner of Patents and Trademarks